United States Patent [19]

Ezawa et al.

[11] Patent Number: 4,966,805

[45] Date of Patent: Oct. 30, 1990

[54] HEAT-SHRINKABLE POLYSTYRENE-BASE FOAMED COMPOSITE SHEET

[75] Inventors: Hiroshi Ezawa; Takayuki Watanabe, both of Yokohama; Hiroaki Tsushima, Kamakura; Zyuzo Nishiba, Washimiya, all of Japan

[73] Assignee: Mitsui Toatsu Chemicals, Inc., Tokyo, Japan

[21] Appl. No.: 496,011

[22] Filed: Mar. 20, 1990

[30] Foreign Application Priority Data

Mar. 28, 1989 [JP] Japan .................................. 1-73932

[51] Int. Cl.$^5$ ............................................. B32B 3/26
[52] U.S. Cl. .................................... 428/212; 428/215; 428/317.1; 428/317.7; 428/319.3; 428/319.7; 428/913; 156/331.4
[58] Field of Search .................... 428/212, 215, 317.1, 428/317.7, 319.3, 319.7, 913

[56] References Cited

FOREIGN PATENT DOCUMENTS

| | | | |
|---|---|---|---|
| 59-85743 | 5/1984 | Japan | 428/317.7 |
| 63-4789 | 1/1988 | Japan | 428/317.7 |
| 1189362 | 4/1970 | United Kingdom | 428/317.7 |
| 2160818 | 1/1986 | United Kingdom | 428/317.7 |

*Primary Examiner*—William J. Van Balen
*Attorney, Agent, or Firm*—Burns, Doane, Swecker & Mathis

[57] ABSTRACT

The invention relates to a heat-shrinkable polystyrene-base foamed sheet prepared by laminating a heat-shrinkable polystyrene-base foamed sheet and a heat-shrinkable polystyrene-base film with a polyurethane-base adhesive wherein printing is applied to the laminating surface of the sheet and/or the film.

14 Claims, No Drawings

HEAT-SHRINKABLE POLYSTYRENE-BASE FOAMED COMPOSITE SHEET

BACKGROUND OF THE INVENTION (a) Field of the Invention

The present invention relates to a polystyrene-base foamed composite sheet having heat-shrinkable properties.

(b) Prior Art of the Invention

Heat-shrinkable polystyrene-base foamed sheets have been widely used for covering labels of bottles and plastic vessels. When the sheets are employed for various uses, the sheets are often printed prior to use. Polystyrene-base foamed sheets are substantially opaque and hence printing must be conducted on the surface of the foamed sheets. As a result, the printed surface is rubbed when the printed labels are fitted onto the vessels or when charging contents into the label-covered vessels, which leads to problems such as scraping off of printed patterns or transfer of ink. There is a need in the art to resolve these problems.

On the other hand, it has been proposed that a composite sheet be prepared by laminating a polystyrene-base foamed sheet and a polystyrene-base film, and that printing be applied between the foamed sheet and the film. As a method of the above lamination, attempts have made to heat the polystyrene-base film and directly weld the same onto a polystyrene-base foamed sheet or to stick the polystyrene-base film on the polystyrene-base foamed sheet by using a thermoplastic adhesive resin as a binder.

In the above methods, however, heat is applied when a heat-shrinkable polystyrene-base foamed sheet and a heat-shrinkable polystyrene-base film are laminated, which leads to shrinkage of the foamed sheet and the film. Consequently, the composite sheet obtained by the above process causes deformation of the printed patterns or becomes unstable and deviates from the prescribed dimensions.

In addition, the foam cells in the boundary layer of the polystyrene base foamed sheet to be adhered expand in the operation of thermal adhesion. Thus, essential surface smoothness of the polystyrene-base film is impaired and the commodity value of the composite sheet is extremely decreased.

Furthermore, the composite sheet having impaired activity and enlarged irregularity on the surface causes much loss and trouble when the composite sheet is wound onto the vessels. For example, the vessels can be covered with the composite sheet at a rate of 100 vessels per minute by simultaneously cutting a continuous sheet into a prescribed length immediatly prior to winding the same onto vessels. In such a step, the front part of the composite sheet is placed under suction and the rear end of the sheet is cut with a cutter. A sheet having surface irregularity cannot be sufficiently sucked which leads to an irregular cut surface.

Additionally, in order to reduce the amount of heat required for adhesion, attempts have been made to apply thermoplastic resin base adhesive. However, labels composed of such composite sheet cause delamination at the interface of the foamed sheet and the film during subsequent heat treatment such as pasteurization. Consequently, restriction is imposed upon the use of such composite sheets.

SUMMARY OF THE INVENTION

The present invention overcomes the problems and disadvantages of the prior art by providing a polystyrene-base foam composite sheet having improved heat-shrinkable properties over the prior art.

The objects of the present invention are to provide a compsite sheet which is excellent in dimensional stability of pattern, resistant to crease during heat-shrinking, resistant to heat treatment such as pasteurization, and has outstanding appearance.

Additional objects and advantages of the invevtion will be set forth in part in the description which follows, and in part will be obvious from the description, or may be learned by practice of the invention will be realized and attained by means of the instrumentalities and combinations, particularly pointed out in the appended claims.

To achieve the objects and in accordance with the purpose of the invention, as embodied in and broadly described herein, the invention provides a heat shrinkable polystyrene-base foamed composite sheet prepared by laminating a heat-shrinkable polystyrene-base foamed sheet and a printed polystyrene-base film by applying a polyurethane-base adhesive between the surfaces of lamination.

The heat-shrinkable polystyrene-base foamed composite sheet of the invention prevents printed ink from directly rubbing with other articles and hence eliminates the problems of scraping off and transfer of the ink. Lamination can be carried out at temperatures that neither result in heat-shrinkage nor expansion of foam cells by using the polyurethane-base adhesive of the invention. Consequently, almost no variation of the printed pattern is found and surface smoothness of the polystyrene-base film can also be maintained. Hence, the commodity value of vessels is increased by wrapping the vessels in the composite sheet of the invention.

The composite sheet of the present invention has surface smoothness in addition to substantial rigidity of the polystyrene-base foamed sheet. Consequently, high speed equipment for fitting the composite sheet on vessels can greatly reduce rejection due to misregistration or bent back of the sheet.

When the composite sheet of the present invention is fabricated to form a cylinder, a vessel is inserted in the cylinder, and heat is applied to cause shrinkage of the composite sheet, the heat-shrinked label thus obtained has an excellent appearance without crease or entrainment.

The label covering the vessel does not generate delamination even in a processing line which requires heat-treatment step such as pasteurization, and accordingly has a wide field of application.

DESCRIPTION OF THE PREFERRED EMBODIMENTS

Reference will now be made in detail to the preferred embodiments of the invention.

The heat-shrinkable polystyrene-base foamed sheet of the present invention has a thickness of from 0.1 to 1.0 mm, preferably from 0.15 to 0.5 mm and an apparent density of from 0.15 to 0.70 g/cm$^3$, preferably from 0.20 to 0.50 g/cm$^3$. The foamed sheet exhibits marked shrinkage in the flow direction when heated to 120° C. The shrinkage is preferably 30% or more in a first direction and less than 20% in a second direction, more preferably from 40 to 70% in one direction and less than 15% in the second direction. When the thickness of the foamed sheet is less than 0.1 mm, the foamed sheet is liable to tear during lamination and the composite sheet obtained causes shortage of strength on the sealing surface and poor appearance in the step of preparing a cylinder (sleeve). When the thickness exceeds 1 mm, bent crease is apt to occur during the sleeve preparation step. When the apparent density of the foamed sheet is less than 0.15 g/cm$^3$, the foamed sheet tends to cause irregular shrinkable when the composite sheet is heated. On the other hand, an apparent density exceeding 0.7 g/cm$^3$ is liable to cause cracking when the composite sheet is bent during the sleeve preparation step. The composite sheet obtained by laminating with the polystyrene-base film may be cut into a rectangular form so that the direction having large shrinkage coincides with the peripheral direction when the composite sheet is adhered to the vessel. The cylinder (sleeve) obtained by sealing the edge face is placed outside the vessel and adhered closely to the vessel by heating. However, when the shrinkability of the polystyrene-base foamed sheet in the peripheral direction is less than 30%, the cylinder of the composite sheet becomes difficult to adhere to the vessel. On the other hand, the polystyrene-base foamed sheet having shrinkability exceeding 20% in the direction of vessel height causes remarkable deformation of printed pattern or leads to dislocation of the fitted position after shrinkage and thus impairs commodity value.

The surface of the foamed sheet where polyurethane-base adhesive is applied is more preferably subjected to corona discharge treatment and surface tension of at least 36 dyne/cm is favorable.

The preparation method of the heat-shrinkable polystyrene-base foamed sheet will be described below.

The raw material resin used for the preparation of the polystyrene-base foamed sheet is general purpose polystyrene (GPPS). Additional exemplary suitable resins include high impact polystyrene (HIPS) and copolymers of styrene with methacrylic acid or maleic anhydride. These raw material resins can also be used as a principal component and rubber or olefin base resin can be added thereto to regulate flexibility and heat-shrinkability of the foamed sheet.

Exemplary suitable foaming agents which can be used for preparing the foamed sheet include, for example, hydrocarbons such as propane, butane and pentane; low-boiling halogenated organic compounds such as Flon-123, -134, -141, -22, -11, and -12 (Mitsui du Pont Fluoro Chemical Co. Ltd.); and heat-decomposable chemical foaming agents such as sodium hydrogen carbonate and citric acid. The size of the foam cell is regulated by addition of nucleating agents such as talc and silica. Further, additives such as antistatic agents and colorants may also be added.

The foamed sheet can be prepared by using common extruding equipment for foamed articles. The thickness of the foamed sheet is controlled by varying the amount of resin delivered from a die fitted on the front barrel flange of the extruder and the take-off speed of the extrudate.

The apparent density of the foamed sheet depends upon the amount of a foaming agent added. When a low boiling organic compound is used alone, the density is usually from $5 \times 10^{-5}$ to $5 \times 10^{-2}$ mole/100 g. When a chemical foaming is used in combination, the amount of the organic compound employed is less than set forth above.

The shrinkability of the polystyrene-base foamed sheet is provided in the take-off step of the delivered sheet from the extruder in which the above raw materials are previously heat-mixed.

The shrinkage in the larger shrinking direction of the foamed sheet is controlled, for example, by maintaining the take-off speed at a higher rate than the out-put rate of the resin from the extruder die. In such a case, the take-off speed is usually from 1.5 to 5 times the out-put rate.

The shrinkage in the second direction is regulated by the ratio of a diameter of the foamed sheet after expansion to the diameter of the die (B.U.R.). B.U.R. is usually in the range of 1.5 to 2.5.

A co-extruded foamed sheet of two-layer structure having a solid layer on one side is also used as the polystyrene-base foamed sheet of this invention. Exemplary suitable polystyrene-base resins suitable for use as the solid layer of the foamed sheet include GPPS, HIPS, styrene-butadiene block copolymer, styrene-ethylene-butylene block copolymer and styrene-butadiene rubber. These resins may be singly or as a mixture. In the co-extruded foamed sheet, a solid layer having a thickness of from 0.005 to 0.05 mm is located on the adhesive surface. Hence, the layer favorably maintains smoothness and increases adhesive force to the polyethyrene-base film of the invention.

The polystyrene-base film used in the present invention has a thickness of from 0.01 to 0.1 mm, preferably from 0.015 to 0.05 mm. A polymer or a mixture of polymer selected from GPPS, HIPS and a styrene-butadiene block copolymer is extruded into a film and then uniaxially or biaxially stretched to obtain the polystyrene-base film of the invention. The preferred polystyrene-base film has similar shrink properties to those of the polystyrene-base foamed sheet. The shrinkage of the film after heating at 120° C. is 25% or more in one direction (flow direction) and 5 to 25% in the rectangular direction.

When the film thickness is less than 0.01 mm, film break is liable to occur in the printing or laminating step. On the other hand, a thickness exceeding 0.1 mm tends to cause voids after lamination in the interface of the foamed sheet and the film.

When the shrinkage in the flow direction is less than 25% after heating at 120° C., the composite sheet is apt to cause creases resulting from insufficient shrinkage and hence impair appearance. In addition, such a composite sheet leads to a loose contact with the vessel and hence the label cannot perform its function. A shrinkage of less than 5% in the rectangular direction tends to cause tear in the film forming process and the printing or laminating stage, thereby generating much loss. On the other hand, a shrinkage exceeding 25% leads to irregular position of the covering label over the vessel or results in a large deformation of the pattern.

The heat-shrinkability of the polystyrene-base film and the foamed sheet were compared at 120° C. in the same laminating direction. In the larger shrinkage direction, it was found that 1.0 < foamed sheet shrinkage/film shrinkage < 1.5.

When the resulting composite sheet is cut into a rectangle shape, overlapped, both edge faces sealed, placed on a vessel, and heated, film shrinkage larger than that of the foamed sheet result in rib like shrink-creases. On the other hand, a foamed sheet shrinkage exceeding 1.5 times that of the film results in generation of small creases on the film.

When compared in the direction of smaller shrinkage, 0.6<formed sheet shrinkage/film shrinkage<2.0. When the foamed sheet shrinkage is half or less of the film shrinkage, top and bottom ends of the cylinder (sleeve) are bent back to the foamed sheet side on heating which results in poor appearance such as irregularity in height. On the other hand, when the foamed sheet shrinkage is less than 0.6 of the film shrinkage, the top and bottom ends are released from the vessel surface and turned over which to cause poor appearance and additional label break in the vessel washing step.

The preparation method of the polystyrene-base film for use in the present invention will hereinafter be described.

Exemplary suitable raw material resin include GPPS, HIPS, styrene-butadiene copolymer and styrene copolymer with methacrylic acid or maleic anhydride. Rubbers, elastomers and plasticizers may be added to control flexibility and heat shrinkability. Antioxidants and lubricants may also be incorporated.

Preferably, the raw material resin of the film is obtained by mixing HIPS or GPPS with styrene-butadiene copolymer.

Polystyrene-base film can be prepared by using a common extruder. However, an inflation method is preferred to provide the above heat-shrinkability. The same procedures as are conducted to prepare the foamed sheet are carried out to control the thickness and heat shrinkability of the film.

A polyurethane-base adhesive is used in the present invention. The adhesive can withstand heat treatment steps such as pasteurization, does not harden coated surface of the formed sheet or the film, and has an advantage of absorbing the strain generated in the cylinder forming step of the composite sheet.

The polyurethane-base adhesive of the present invention is prepared by reacting a polyisocyanate having two or more isocyanate groups in a molecule with a polyether polyol or a polyester polyol having hydroxyl groups at the ends of the polymer chain. Non solvent type adhesive is preferred.

Exemplary suitable isocyanates useful as an adhesive in the invention include hexamethylene diisocyanate, lysine diisocyanate 4,4'-methylenebis(cyclohexyl isocyanate), methylenedicyclohexane-2,4-diisocyanate, methylenedicyclohexane-2,6-diisocyanate, 1,3-(isocyanatomethyl)cyclohexane, isophorone diisocyanate, trimethylhexamethylene diisocyanate, dimer acid diisocyanate, tolylene diisocyanate, 4,4'-diphenylmethane diisocyanate, xylylene diisocyanate, m-xylylene diisocyanate and a prepolymer of these isocyanates containing free isocyanate groups. These isocyanates are reacted with polyesters, polyethers or glycols containing terminal hydroxyl groups to obtain the polyurethane-base adhesive. Preferred adhesives include two component type adhesives obtained by reacting a water adduct of hexamethylene diisocyanate with a polyester having hydroxyl groups on both ends. These adhesives are available in the market, for example, Adcote AD-N401 A/B (a product of Toyo Moton Co. Ltd.) and Olester NP-1100/NL-2448 (a product of Mitsui Toatsu Chemicals Inc.).

Common dry lamination equipment can be used for applying the polyurethane-base adhesive to the interface of the above heat-shrinkable polystyrene-base foamed sheet and the heat-shrinkable polystyrene-base film. The thickness of the polyurethane-base adhesive applied is in the range of from 1 to 10$\mu$m. When the thickness is less than $\mu$m, the adhesive force between the polystyrene-base foamed sheet and the polystyrene-base film is not sufficient. For example, heat treatment such as pasteurization leads to partial delamination of the film. Even though the thickness of the adhesive exceeds 10$\mu$m, it cannot be expected to further improve the stabilization of pattern which is the effect of the present invention.

The heat-shrinkable polystyrene-base foamed composite sheet of the present invention is prepared by laminating the above polystyrene-base foamed sheet and the polystyrene-base film with the polyurethane-base adhesive.

In the composite sheet, characters and patterns are printed on the surface of the polystyrene-base foamed sheet or on the underside of the polystyrene-base film. The underside of the polystyrene-base film is preferred. The above sheet and film are adhered by the polyurethane-base adhesive so as to insert the characters and patterns between the polystyrene-base foamed sheet and the polystyrene-base film.

The embodiments of the present invention are, for example, a composite sheet obtained by printing characters and patterns on the surface of a polystyrene-base foamed sheet, applying a polyurethane-base adhesive thereon and laminating a polystyrene-base film on the applied adhesive, and a composite sheet obtained by applying a polyurethane-base adhesive on the surface of a polystyrene-base foamed sheet and laminating thereon a polystyrene-base film where characters and patterns are previously printed on the underside. A preferred embodiment is a composite sheet obtained by printing the underside of the polystyrene-base film, applying the polyurethane-base adhesive thereon and then laminating the polystyrene-base foamed sheet on the adhesive.

In addition, application of printing both on the underside of the film and on the surface of the foamed sheet to exhibit specific design effect is permitted so long as these printed surfaces are adhered through the adhesive layer.

The present invention will be further clarified by the following examples, which are intended to be purely exemplary of the invention.

Example 1

A heat-shrinkable polystyrene foamed sheet was prepared by a co-extrusion process. As raw materials of a foamed layer, 100 parts by weight of GPPS(Topolex; a product of Mitsui Toatsu Chemicals Inc.), 0.3 part by weight of talc (Microace; a product of Nippon Talc Co., Ltd.) and 5 parts by weight of Flon-22(a product of Mitsui du Pont Fluoro Chemical Co. Ltd.) were used. On the other hand, 100 parts by weight of GPPS(Topolex), 10 parts by weight of styrene-ethylene-butylene block copolymer and 3 parts by weight of a white colorant were used for the raw materials of a solid layer. The two-layered heat-shrinkable foamed sheet thus obtained had thickness of 0.17 mm in the foamed layer and 0.015 mm in the solid layer. Shrinkage of the sheet was measured by immersing the sheet in an oil bath at 120° C. for one minute. The shrinkage was 55% in the flow direction and 5% in the rectangular direction.

A polystyrene film was prepared by an inflation film forming process from 20 parts by weight of styrene-butadiene block copolymer (K-Resin; a product of Phillips Petroleum Co. Ltd.) and 80 parts by weight of GPPS (Topolex). The film had a thickness of 0.025 mm, and a shrinkage of 40% in the flow direction and 12% in the rectangular direction.

Characters and patterns were printed on the film so as to be read through the film.

The above heat-shrinkable polystyrene-base foamed sheet and polystyrene-base film were laminated by using a polyurethane-base adhesive (Adcode; a product of Toyo Moton Co. Ltd.). The composite sheet obtained had exactly an excellent dimensional accuracy of 0.2 mm or less and the surface Of the laminated polystyrene-base film was very smooth.

A smoothness test using a Bekk tester in accordance with JIS P-8119 resulted in 900 seconds or more.

The composite sheet thus obtained was slitted into a width of 100 mm and a winding test on a glass bottle was conducted by using a lapping machine. Labels were cut exactly with high dimensional accuracy and low loss. The label wound glass bottle was passed through a shrink tunnel at 170° C. The label shrunk to adhere closely to the shoulder and bottom portions of the glass bottle.

Comparative Example 1

A composite sheet was obtained by carrying out the same procedures as conducted in Example 1 except that a polystyrene film was laminated directly by hot rolls with a heat-shrinkable polystyrene foamed sheet in place of the polyurethane-base adhesive of Example 1. Properties and evaluation results are illustrated in Table 1.

Comparative Example 2

A Composite sheet was obtained by carrying out the same procedures as conducted in Example 1 except that a polystyrene-base foamed sheet having a shrinkage of 25% in the flow direction and 5% in the rectangular direction was used. The composite sheet obtained was wound on a glass bottle and passed through the skrink tunnel. Shrinkage of the sheet was insufficient and non-uniformity of shrinkage was found.

Examples 2–5 and Comparative Examples 3–8

Foamed sheets having various thickness, apparent density and shrinkage were prepared according to the below described preparation example of heat-shrinkable polystyrene foamed sheet. Properties of the foamed sheets prepared are illustrated in Table 2.

[Preparation example of heat-shrinkable polystyrene foamed sheet]

Into a tandem type foam extruder, 100 parts by weight of GPPS (Topolex; a product of Mitsui Toatsu Chemicals Inc.) and 0.3 part by weight of talc (Microace; a product of Nippon Talc Co. Ltd.) were charged and melt-mixed. Then Flon-22 (a product of Mitsui du Pont Fluoro Chemicals Co. Ltd.) was injected and kneaded in the extruder. The mixture obtained was delivered from a die into the air to form a foamed layer. On the other hand, 100 parts by weight of GPPS (Topoler), 10 parts by weight of a styrene-ethylene-butylene block copolymer and 3 parts by weight of a white colorant were melt-mixed in an extruder having a diameter of 40 mm and extruded in a ratio of 25 weight % per weight of the foamed layer to form a solid layer. By the above co-extrusion process, a foamed sheet having a two-layer structure was obtained. Setting B.U.R. at 2.3, thickness of the foamed sheet was regulated by varying take-off speed, apparent density was controlled by the injection amount of foaming agent, and heat-shrinkability was regulated by changing the area of die aperture, that is, the ratio of take-off speed/out-put speed.

The foamed sheets illustrated in Table 2 were used. The same polystyrene-base film and adhesive as used in Example 1 were employed.

The polystyrene-base film was printed. Using common dry lamination equipment, the adhesive was applied to the printed surface of the polystyrene-base film, and the foamed sheet was laminated thereon, followed by standing for 48 hours in a constant temperature room to obtain the composite sheet.

It can be seen from Table 2 that the printed pattern was stable and had a shrinkage of 0.1% or less both in the direction of flow and in the direction of width.

The composite sheet was subjected to practical evaluation in each step by the following methods of evaluation.

(1) Sleeve preparation and fitting step:

The composite sheet was cut into a dimension of 170×95 cm. Sleeves were continuously prepared by heat-sealing the cut sheets and fitted on glass bottles having 52 mm in drum diameter and 125 mm in height.

(2) Heat-shrinking step:

Fitted bottles were passed through a shrink tunnel at an atmospheric temperature of 170° C. to adhere the composite sheet closely to the bottle and appearance was observed.

(3) Filling step:

Beverage was filled into the bottles covered with labels of the composite sheet. The filled bottled were subjected to pasteurization at 80° C. After completion of pasteurization, the appearance of the labels was observed.

Evaluation results of the composite sheet were summarized in Table 2.

It can be seen that the performance of the composite sheet is remarkably varied by the thickness, apparent density and heat-shrinkage of the foamed sheet.

Examples 6–7 and Comparative Examples 9–12

In the preparation example of heat-shrinkable polystyrene foamed sheet in Example 2, the solid layer was omitted and a foamed sheet having a single layer structure was prepared. The sheet had a thickness of 0.17 mm, an apparent density of 0.35 g/cm$^3$, a shrinkage of 56% in the flow direction at 120° C. and a shrinkage of 14% in the width direction at 120° C. The same adhesive as used in Example 2 were employed. The thickness and heat-shrinkage of the polystyrene-base films were varied as illustrated in Table 3. Other procedures were the same as conducted in Example 2 to obtain composite sheets. Properties of these composite sheets was stepwise evaluated as conducted in Example 2. Results are illustrated in Table 3. It can be seen that the performance of the composite sheet was remarkably varied by the thickness and heat-shrinkage of the film.

Example 8 and Comparative Examples 13–14

Composite sheets were prepared by carrying out the same procedures as conducted in Example 1 except that the adhesive was changed.

Properties of the composite sheets and evaluation results are illustrated in Table 4.

In example 8 a polyurethane adhesive was employed which was obtained by reacting a polyisocyanate having an isocyanate content of about 28% with a hydroxyl group terminated polyester (Olester NP-1100; a product of Mitsui Toatsu Chemicals Inc.).

In comparative Example 13 a solvent type adhesive (Konishi Bond VP-2000; a product of Konishi Co. Ltd.) was employed.

In comparative Example 14 an adhesive of ethylene-vinyl acetate copolymer was employed.

It can be seen that Example 8 is superior to Comparative Examples 13 and 14 in deformation of pattern and successive steps.

Comparative Example 15

A composite sheet was prepared by carrying out the same procedures as conducted in Example 1 except that the polystyrene film was laminated directly with the heat-shrinkable polystyrene formed sheet by using hot-rolls in place of the polyurethane-base adhesive. The surface temperature of the hot-rolls was 160° C.

Adhesive strength of the polystyrene foamed sheet to the polystyrene film was sufficient, but the pattern shrunk in an amount of from 2 to 5% and caused much rejection. Sleeves were prepared from the composite sheet, fitted on glass bottles and passed through the pasteurization step. As a result, the film was partially delaminated.

Other embodiments will be apparent to these skilled in the art from consideration of the specification and practice of the invention disclosed herein. It is intended that the specification and examples be considerd as exemplary only with the true scope and spirit of the invention being indicated by the following claims.

TABLE 1

|  | Example 1 | Comparative Example 1 | Comparative Example 2 |
|---|---|---|---|
| Polystyrene-base foamed sheet Thickness (mm) | 0.175 | 0.205 | 0.175 |
| Shrinkage (%) |  |  |  |
| Flow direction | 45 | 50 | 23 |
| Rectangular direction | 15 | 5 | 5 |
| Smoothness (sec) | 980 | 150 | 970 |
| Practical wrapping test (Number of rejection/1,000 label) | 2 | 55 | 3 |
| Shrinkability | Good | Good | Defective shrinkage at shoulder and bottom |

TABLE 2

|  | Example | | | | Comparative Example | |
|---|---|---|---|---|---|---|
|  | 2 | 3 | 4 | 5 | 3 | 4 |
| Foamed sheet thickness (mm) | 0.17 | 0.50 | 0.12 | 0.17 | 0.09 | 1.1 |
| Apparent density (g/cm³) | 0.35 | 0.16 | 0.50 | 0.41 | 0.67 | 0.16 |
| Heat shrinkage (%) |  |  |  |  |  |  |
| Flow direction | 55 | 42 | 48 | 45 | 60 | 32 |
| width direction | 15 | 8 | 16 | 19 | 18 | 3 |
| Sleeve preparation and fitting step | Good | Good | Good | Good | Sealed edge tends to tear on inserting bottle | Sleeve bend back |
| Heat-shrinking step | Good | Good | Good | Good | — | Deflective shrinkage at bent back portion |
| Filling step | Good | Good | Good | Good | — | — |

|  | Comparative Example | | | |
|---|---|---|---|---|
|  | 5 | 6 | 7 | 8 |
| Foamed sheet thickness (mm) | 0.46 | 0.11 | 0.30 | 0.17 |
| Apparent density (g/cm³) | 0.13 | 0.72 | 0.17 | 0.65 |
| Heat shrinkage (%) |  |  |  |  |
| Flow direction | 52 | 44 | 28 | 40 |
| width direction | 11 | 9 | 0 | 22 |
| Sleeve preparation and fitting step | Good Sleeve cracks at sealed portion. | Many defective seals. | Good | Good |
| Heat-shrinking | Sometimes partially delaminated | — | Do not adhere closely to glass battle | Large shrinkage in the sleeve height direction |
| Filling step | — | — | — | — |

TABLE 3

|  | Example | | Comparative Example | | | |
|---|---|---|---|---|---|---|
|  | 6 | 7 | 9 | 10 | 11 | 12 |
| Film thickness (mm) | 0.015 | 0.09 | 0.11 | 0.025 | 0.025 | 0.025 |
| Film shrinkage (%) |  |  |  |  |  |  |
| Flow direction | 55 | 39 | 38 | 60 | 51 | 48 |
| Width direction | 12 | 10 | 8 | 13 | 3 | 27 |
| Sleeve preparation and fitting step | Good | Good | Good | Good | Good | Good |
| Heat-shrinking step | Good | Good | Good | Small wrinkle at top | Curl to inside at top | Large shrinkage in |

TABLE 3-continued

| | Example | | Comparative Example | | | |
|---|---|---|---|---|---|---|
| | 6 | 7 | 9 | 10 | 11 | 12 |
| | | | | and bottom edges of sleeve | and bottom edges of sleeve | height. Curl to outside at top and bottom edges |
| Filling step | Good | Good | pot lister | — | — | — |

TABLE 4

| | Example | Comparative Example | |
|---|---|---|---|
| | 8 | 13 | 14 |
| Adhesive | Polyurethane (Mitsui Toatsu Chemicals) | Acryl (Konishi) | Ethylene-vinyl acetate compolymer |
| Thickness applied (μm) | 1 | 3 | |
| Sleeve preparation and fitting step | Good | Cracks in polystyrene film an sleeve preparation | Good |
| Heat-shrinking step | Good | — | Small wrinkle in polystyrene film |
| filling step | Good | — | 13 |

What is claimed is.

1. A heat-shrinkable polystyrene-base foamed composite sheet prepared by laminating a heat-shrinkable polystyrene-base foamed sheet and a heat-shrinkable polystyrene-base film by applying a polyurethane-base adhesive between said foamed and said film.

2. A heat-shrinkable polystyrene-base foamed composite sheet prepared by laminating a heat-shrinkable polystyrene-base foamed sheet and a printed heat-shrinkable polystyrene-base film by applying a polyurethane-base adhesive between said foamed sheet and said film.

3. A heat-shrinkable polystyrene-base foamed composite sheet prepared by laminating a heat-shrinkable polystyrene-base foamed sheet and a heat shrinkable polystyrene-base film by applying a polyurethane base adhesive between said foamed sheet and said film to form a composite sheet and applying printed to said sheet.

4. heat-shrinkable polystyrene-base foamed composite sheet of claim 1 wherein said heat-shrinkable polystyrene-base foamed sheet has a thickness of from 0.10 to 1.0 mm and an apparent density of from 0.15 to 0.70 g/cm$^3$ and said heat-shrinkable polystyrene-base film.

5. The heat-shrinkable polystyrene-base foamed composite sheet of claim 1 wherein said heat-shrinkable polystyrene-base foamed sheet had a heat-shrinkability of from 30 to 70% in a first direction and a heat-shrinkability of less than 20% in second direction on heating at 120° C.

6. The heat-shrinkable polystyrene-base foamed composite sheet of claim 1 wherein said heat-shrinkable polystyrene-base foamed sheet comprises a first solid layer and a second foamed layer.

7. The heat-shrinkable polystyrene-base foamed composite sheet of claim 1 wherein said polyurethane base adhesive is a non-solvent type polyurethane-base adhesive.

8. The heat-shrinkable polystyrene-base foamed composite sheet of claim 1 wherein said polyurethane-base adhesive is applied in a thickness of from 1 to 10 μm.

9. The heat-shrinkable polystyrene-base foamed composite sheet of claim 2 wherein said heat-shrinkable polystyrene-base foamed sheet has a thickness of from 0.10 to 1.0 mm and an apparent density of from 0.15 to 0.70 g/cm$^3$ and said printed heat-shrinkable polystyrene-base film has a thickness of from 0.01 to 0.1 mm and said polyurethane base adhesive is applied in a thickness of from 1 to 10μm.

10. The heat-shrinkable polystyrene-base foamed composite sheet of claim 1 wherein said polystyrene-base foamed sheet has a heat-shrinkability of from 30 to 70% in a first direction and a heat-shrinkability of less than 20% in a second direction upon heating at 120° C. and said polystyrene-base film has a heat-shrinkability of 25% or more in one direction and from 5 to 25% in a second direction upon heating at 120° C.

11. The heat-shrinkable polystyrene-base foamed composite sheet of claim 1 wherein said heat-shrinkability of said polystyrene-base film has, in the same direction as the direction of the polystyrene-base foamed sheet to be laminated, a relationship at 120° C.:1.0<shrinkage of foamed sheet/shrinkage of film<1.5 in the first shrinkage direction of the foamed sheet, and 0.6<shrinkage of foamed sheet/shrinkage of film<2.0 in the second shrinkage direction of the foamed sheet.

12. A process for preparing a heat-shrinkable polystyrene-base foamed composite sheet comprising laminating a heat-shrinkable polyestyrene-base foamed sheet and a heat-shrinkable polystyrene-base film by applying a polyurethane-base adhesive between said foamed sheet and said film.

13. The process of claim 12 wherein said heat-shrinkable polystyrene-base film is printed.

14. The process of claim 12 wherein subsequent to lamination, printing is applied to said composite.

* * * * *

UNITED STATES PATENT AND TRADEMARK OFFICE
CERTIFICATE OF CORRECTION

PATENT NO. : 4,966,805

DATED : October 30, 1990

INVENTOR(S) : Hiroshi Ezawa et al.

It is certified that error appears in the above-identified patent and that said Letters Patent is hereby corrected as shown below:

Column 11:

In claim 4, line 52, before "heat-shrinkable" insert -- The --.

Signed and Sealed this

Second Day of June, 1992

Attest:

DOUGLAS B. COMER

Attesting Officer

Acting Commissioner of Patents and Trademarks